United States Patent
Rocci et al.

(10) Patent No.: US 11,197,219 B2
(45) Date of Patent: Dec. 7, 2021

(54) METHOD AND APPARATUS FOR PROVIDING VARIED DATA LIMITS TO VARIED WIRELESS DEVICES USING THE SAME VEHICLE HOTSPOT

(71) Applicant: FORD GLOBAL TECHNOLOGIES, LLC, Dearborn, MI (US)

(72) Inventors: Benjamin M. Rocci, Ann Arbor, MI (US); Mark Anthony Rockwell, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

(21) Appl. No.: 16/285,621

(22) Filed: Feb. 26, 2019

(65) Prior Publication Data
US 2020/0275336 A1    Aug. 27, 2020

(51) Int. Cl.
| | | |
|---|---|---|
| *H04W 36/26* | (2009.01) | |
| *H04W 28/20* | (2009.01) | |
| *H04W 4/40* | (2018.01) | |
| *H04W 72/04* | (2009.01) | |
| *H04W 28/22* | (2009.01) | |
| *H04W 36/16* | (2009.01) | |

(52) U.S. Cl.
CPC ............ *H04W 36/26* (2013.01); *H04W 4/40* (2018.02); *H04W 28/20* (2013.01); *H04W 28/22* (2013.01); *H04W 36/16* (2013.01); *H04W 72/0493* (2013.01)

(58) Field of Classification Search
CPC . H04W 36/26; H04W 28/22; H04W 72/0493; H04W 36/16; H04W 28/20; H04W 4/40; H04W 4/90; H04W 4/48; H04W 28/0284; H04W 88/10; H04W 28/10; H04L 43/0876; H04L 47/25
See application file for complete search history.

(56) References Cited

U.S. PATENT DOCUMENTS

| | | | |
|---|---|---|---|
| 8,818,276 B2* | 8/2014 | Kiukkonen | ......... H04W 12/003 455/41.2 |
| 9,674,700 B2* | 6/2017 | Archibald | ............... H04W 4/80 |
| 9,900,162 B2 | 2/2018 | Woxland et al. | |
| 10,205,831 B1* | 2/2019 | Yan | ...... H04M 15/852 |
| 10,567,983 B2* | 2/2020 | Lei | ......... H04W 24/04 |
| 2005/0083973 A1* | 4/2005 | Krishnan | ............. H04L 69/163 370/468 |
| 2008/0039102 A1* | 2/2008 | Sewall | .................... H04W 4/60 455/445 |

(Continued)

OTHER PUBLICATIONS

Article on "How to Use Your Router to Limit People's Internet Usage" by Weedmark, published Feb. 5, 2019 (Year: 2019).*

(Continued)

*Primary Examiner* — Nishant Divecha
(74) *Attorney, Agent, or Firm* — Michael Spenner; Brooks Kushman P.C.

(57) ABSTRACT

A system includes a wireless transceiver providing access to primary and secondary hotspot in-vehicle networks and a vehicle processor. The vehicle processor monitors data usage on the secondary hotspot network, and, responsive to the data usage exceeding a predefined data limit, throttles a data transfer rate of the secondary hotspot network in a predefined manner, while leaving the primary hotspot network unconstrained.

12 Claims, 4 Drawing Sheets

(56) References Cited

U.S. PATENT DOCUMENTS

| | | | | |
|---|---|---|---|---|
| 2013/0331053 A1* | 12/2013 | Vick | .................. | H04W 4/90 |
| | | | | 455/404.1 |
| 2015/0139042 A1* | 5/2015 | Connelly | .......... | H04W 72/0446 |
| | | | | 370/259 |
| 2018/0077025 A1* | 3/2018 | Helvey | ................... | H04W 4/30 |
| 2019/0313469 A1* | 10/2019 | Karampatsis | ......... | H04W 36/04 |
| 2019/0319951 A1* | 10/2019 | West, III | ............... | H04L 63/126 |

OTHER PUBLICATIONS

An artcile on "ALERT: 15GB Mobile Hotspot Cap Enforcement Coming on Verizon New Unlimited Data Plans" by Cherie, published on Sep. 17, 2017 (Year: 2017) retrieved from https://www.rvmobileinternet.com/alert-15gb-mobile-hotspot-cap-enforcement-coming-on-verizon-new-unlimited-data-plans/.*
An article "Everything you need to know about using Wi-Fi on American Airlines", published on Dec. 29, 2017 (Year: 2017).*
Revolution WI-FI; Limit Ssids & Data Rates to Maintain Network Performance; Oct. 15, 2010; 10 pages.

\* cited by examiner

METHOD AND APPARATUS FOR PROVIDING VARIED DATA LIMITS TO VARIED WIRELESS DEVICES USING THE SAME VEHICLE HOTSPOT

TECHNICAL FIELD

The illustrative embodiments generally relate to methods and apparatuses for providing varied data limits to varied wireless devices using the same vehicle hotspot.

BACKGROUND

In-vehicle Wi-Fi hotspot plans are often structured such that customers pay for, or are provided by an original equipment manufacturer (OEM), with a fixed amount of data per month. In the case of vehicles that are shared among a family or friends or other ownership arrangement such as car-sharing, a secondary user of the vehicle may use the Wi-Fi hotspot in a way that consumes a disproportionate share of the allotted monthly data. The owner of the vehicle may not have any way to limit the consumption of this data by others without deactivating the hotspot altogether or changing the password to completely lock others out of access.

Since many users will want to permit others to have at least limited access to wireless services disabling the hotspot will not work in those situations, as such action would also impose the burden of the primary user no longer being able to access and use the hotspot. On the other hand, leaving the hotspot enabled provides no control over the usage of others, who do not carry the cost of over-use.

SUMMARY

In a first illustrative embodiment, a system includes a wireless transceiver providing access to primary and secondary hotspot in-vehicle networks and a vehicle processor. The vehicle processor is configured to monitor data usage on the secondary hotspot network, and, responsive to the data usage exceeding a predefined data limit, throttle a data transfer rate of the secondary hotspot network in a predefined manner, while leaving the primary hotspot network unconstrained.

In a second illustrative embodiment, a system includes an in-vehicle hotspot including a primary and secondary network and a processor configured to detect a wireless device predesignated as a secondary device. The processor is also configured to grant the secondary device access to the secondary network. The processor is further configured to search for device designated as a primary wireless device using short-range wireless communication and, responsive to a failure to find the primary wireless device, impose a usage limit on the secondary network. The processor is configured to limit secondary network data transfer responsive to detecting that the secondary device has exceeded the usage limit.

In a third illustrative embodiment, a system includes an in-vehicle hotspot including a primary and secondary network and a processor. The processor is configured to detect a wireless device predesignated as a secondary device and grant the secondary device access to the secondary network. The processor is further configured to search for a primary wireless device using short-range wireless communication and, responsive to a failure to find the primary wireless device, imposing a usage limit on the secondary network. The processor is also configured to wirelessly notify the primary wireless device, using long-range wireless communication, when the usage limit is exceeded. Also, the processor is configured to limit data transfer on the secondary network responsive to the usage limit being exceeded, the limit defined based on instructions received remotely from the primary wireless device responsive to the notification.

DETAILED DESCRIPTION

As required, detailed embodiments are disclosed, herein. It is to be understood, however, that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

By controlling data flow over varied vehicle networks, responsive to either predefined parameters or user-instructed limitations, the illustrative embodiments allow for granular control over vehicle data usage and on-demand constraint of data-flow, improving the ability to manage data usage in a vehicle. The uncommon and atypical examples and concepts described herein demonstrate potential improvements achievable through use of those examples, concepts, and the like.

In-vehicle hotspot plans, using in-vehicle services connected to a vehicle data providing device, such as a cellular modem, are often structured such that customers pay for a fixed amount of data or have a data cap associated therewith. With ridesharing becoming ever more increasingly common, as well as vehicle owners offering to rent out personal vehicles for limited use, the likelihood of hitting these data caps is ever increasing.

While one option to address this situation is to simply buy more data, such an option can be expensive and, at certain levels of data, potentially unavailable. Another option is simply to disable the communication capability or change a password, but this can create difficulty for the vehicle owner, having to constantly issue the new password to other users as needed/permitted and/or having to deactivate and reactivate a hotspot based on who is using the vehicle.

Using a dual-service set identifier (SSID) Wi-Fi driver in an embedded modem can provide dual network identifications (IDs), allowing a primary user or users to log onto a first network and secondary users to log onto a second network. Overuse of the second network can result in automatic throttling of data transfer rates by a vehicle (based on owner settings, for example) and/or notification to an owner for on-demand throttling of data. This level of access can also allow for remote enablement/disablement of the hotspot or a network via a user device. In at least one embodiment, the primary network can remain unthrottled and accessible, so that the primary driver(s) or computer driving an autonomous vehicle do/does not experience a deterioration in service and do/does not have to reconfigure network services in an ongoing manner based on who is using the vehicle.

Figure 1:
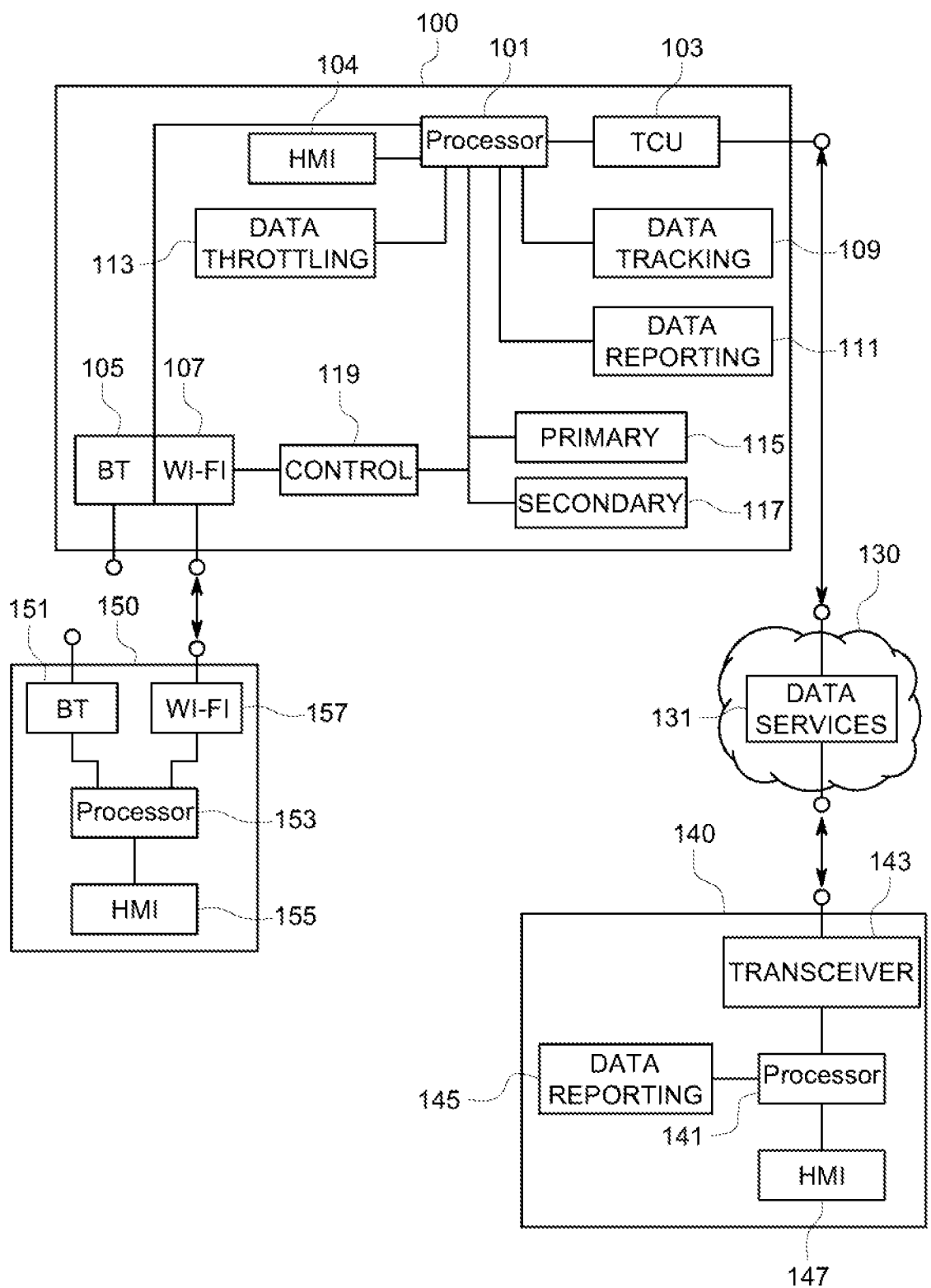
FIG. 1 shows an illustrative system including a vehicle computing system and a plurality of remote devices.

FIG. 1 shows an illustrative system including a vehicle computing system 100 and a plurality of remote devices 140, 150. In this illustrative embodiment, a vehicle 100 is in communication with both a brought-in device 150 and a remote controlling device (e.g., owner device) 140 through the cloud 130.

The vehicle 100 may provide a variety of communication-based services through the cloud, accessible through a vehicle modem included in a telematics control unit (TCU) 103. The modem may include the dual-SSID Wi-Fi driver, providing multiple possible networks for user connection. A processor 101 may control the signals from the TCU 103 to provide primary 115 and secondary 117 networks for access by the brought-in device 150. When a primary user is in the vehicle 100, his or her device(s) 140 may log into the primary 115 network, and when other users (teen drivers, renters, etc.) are in the vehicle 100, their devices 150 may only have authorization to access the secondary 117 network.

A control process 119 may be executed by the CPU 100 to allow the vehicle 100 to dictate which devices 140, 150 can access which of the networks, commonly achieved through login to one or the other of the networks. Devices 140 with authorization to access both primary 115 and secondary 117 networks may have a preference setting for one network or another. The control process 119 can also, in emergency situations for example, unlock or open network access to the primary network if the secondary network is unavailable or throttled.

This illustrative system also includes transceivers for communicating with the brought-in device, such as BLUETOOTH 105 and/or Wi-Fi transceivers 107. The telematics control unit 103 controls communication with remote cellular networks 130.

Information pertaining to vehicle usage, data usage, ongoing connections, etc. may be provided through a vehicle human machine interface (HMI) 104, and the processor 101 may also execute several processes such as the illustrative data throttling process 113, data reporting process 115 and data tracking process 109. This example shows one set of elements useful for practicing certain aspects of the illustrative embodiments, but processes and supporting hardware can be added or removed as needed to practice variants of these embodiments.

The user device 150, sometimes referred to herein as the brought-in device, may include Wi-Fi 157 and BLUETOOTH 151 transceivers, allowing the user device 150 to connect to the vehicle 100. As shown, the user device 150 accesses the vehicle hotspot through a Wi-Fi connection 107. The device 150 also includes a processor 153 to perform various processing tasks, and an HMI 155 through which the user may interact with data-consuming services.

If the data tracking process 109 determines that the aggregate data usage is too high, or that the user device 150 is consuming excessive data, the data reporting process 111 may signal the data reporting services 113. The data reporting services 113 are programmed to report data usage to a controlling user device 140. The controlling user device 140 may include cellular communication capability through a cellular transceiver 143, over which it may receive the notification. The controlling user device 140 may also have an internal processor 141 configured to execute a data reporting process 145, through which the controlling user device 140 can report data usage (obtained from the cloud 130) to a user via the device HMI 147. The controlling device 140 may be onboard, but in many examples, the owner of the vehicle 100, and thus the person responsible for billing overages, may be remote from the vehicle 100 and may wish to engage or disable data-throttling remotely.

The user may also instruct direct control over the data usage via the HMI 147 of the controlling user device 140, and this instruction can be sent back to the vehicle 100, via the cloud 130, for implementation by the data throttling process 113.

Figure 2:
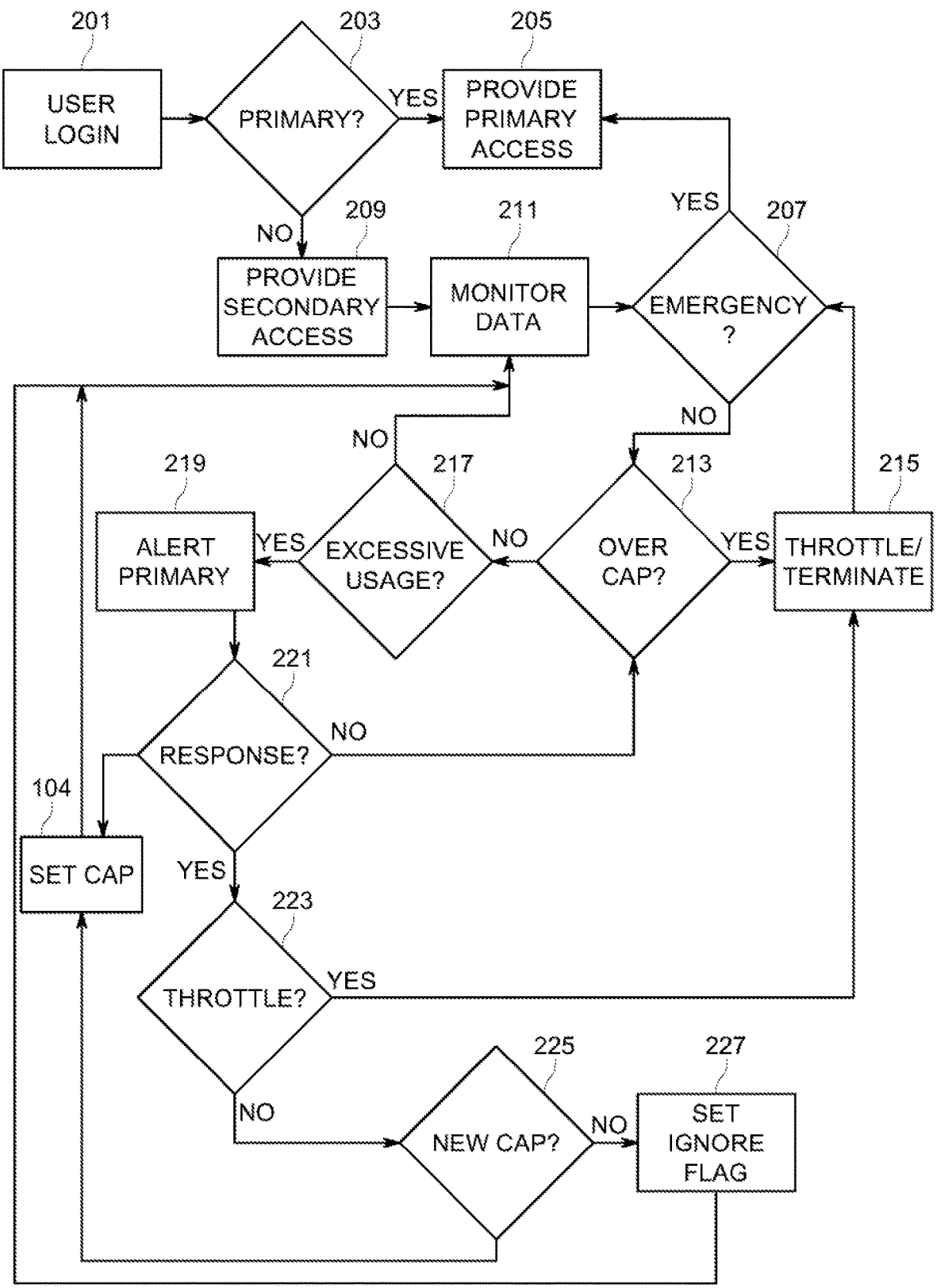
FIG. 2 shows an illustrative process for network usage control.

FIG. 2 shows an illustrative process for network usage control executable by, for example, a vehicle 100 processor 101. In this illustrative example, at 201 the vehicle 100 receives a device login request. The vehicle 100 determines, at 203, if the user device 150 is requesting primary 115 or secondary 117 network access. In this example, assuming, the user device 150 is authorized to access the primary 115 network, at 205 the vehicle 100 provides primary 115 network access to the user device 150 requesting access to the primary 115 network.

If the user device 150 is requesting secondary 117 network access, the vehicle 100 provides, at 209, secondary 117 network access to the user device 150 (if authorized) and at 211 begins monitoring data usage over the secondary 117 network. This allows for real-time monitoring of both immediate and aggregate data usage over the secondary network 117. Users can define both aggregate data usage caps and ongoing data usage caps, to prevent both overall excessive data use (which can be expensive) and ongoing excessive data use (which may indicate a driver is streaming a video or engaged in other potentially undesirable actions).

In this embodiment, if a vehicle emergency occurs at 207, or if a driver indicates an emergency if that capability is provided (e.g., attempts to contact emergency services via the device 150, through a hotspot), the vehicle 100 can unlock the primary network 115 and provide access to the device 150. This can be useful to ensure minimum response time from emergency services, if the secondary network 117 is disabled or throttled.

At any point during the monitoring, if the driver is over a cap at 213 (definable for the duration of a drive, the duration of a rental/borrowing period, or a monthly/weekly data cap, for example), the vehicle 100 may automatically throttle at 215 the secondary network 117 or terminate the primary/secondary network 115/117 functionality or connection. Whether the overuse results in automatic termination or user alert can be a user-configurable determination. If the user was connected to the primary network 115, and the data cap was exceeded, the vehicle 100 could hand the connection over to the secondary network 117, which would presumably then be throttled. This would preserve the functionality of the primary network 115 for validated or owner devices 140.

Also, even if the net cap is not exceeded, in this example, the vehicle 100 may determine if the user is using excessive data at 217 in an ongoing manner (e.g., X amount of data over Y period of time). This can also result in automatic termination or throttling or, in this example, the vehicle 100 alerts a primary user at 219 or controlling user via that user's device 140.

Once the user has been alerted, the vehicle 100 waits for a response from the user at 221, and may, as in this example, continue to permit usage of a primary network 115 or an unthrottled secondary network 117 while awaiting a response. Thus, this example does not enable automatic throttling based on excessive usage. In this example, the vehicle 100 will still terminate or throttle the connection if the net cap is exceeded but will also allow the ongoing excessive usage to continue until the cap is met or a response is obtained from the user device 140. Other embodiments may handle the decision-making differently, the particular choice of actions may be a matter of user-configuration.

If the controlling user elects to throttle or terminate the service at 223, the vehicle 100 can respond accordingly and perform a requested control action (throttle/terminate/handoff). Again, in this example, even if the network 117 is throttled or terminated, an emergency situation at 207 may cause the vehicle 100 to grant access to a primary network 115 and/or remove secondary network 117 constraints at 205.

If the controlling user does not elect to throttle the network, the user may still define a new cap at 225 or simply elect to ignore the usage at 227 for the duration of a drive. Setting an ignore flag allows the user to avoid unnecessary messaging when the controlling user knows that the current in-vehicle user should be allowed to use any amount of data (e.g., a spouse as opposed to a monitored child). The vehicle 100 can react in accordance with on-demand controlling user commands and set a new cap at 229 if so defined. The vehicle 100 will incorporate the new cap and resume monitoring at 211 with the new cap as the cap parameter at 213.

Figure 3:
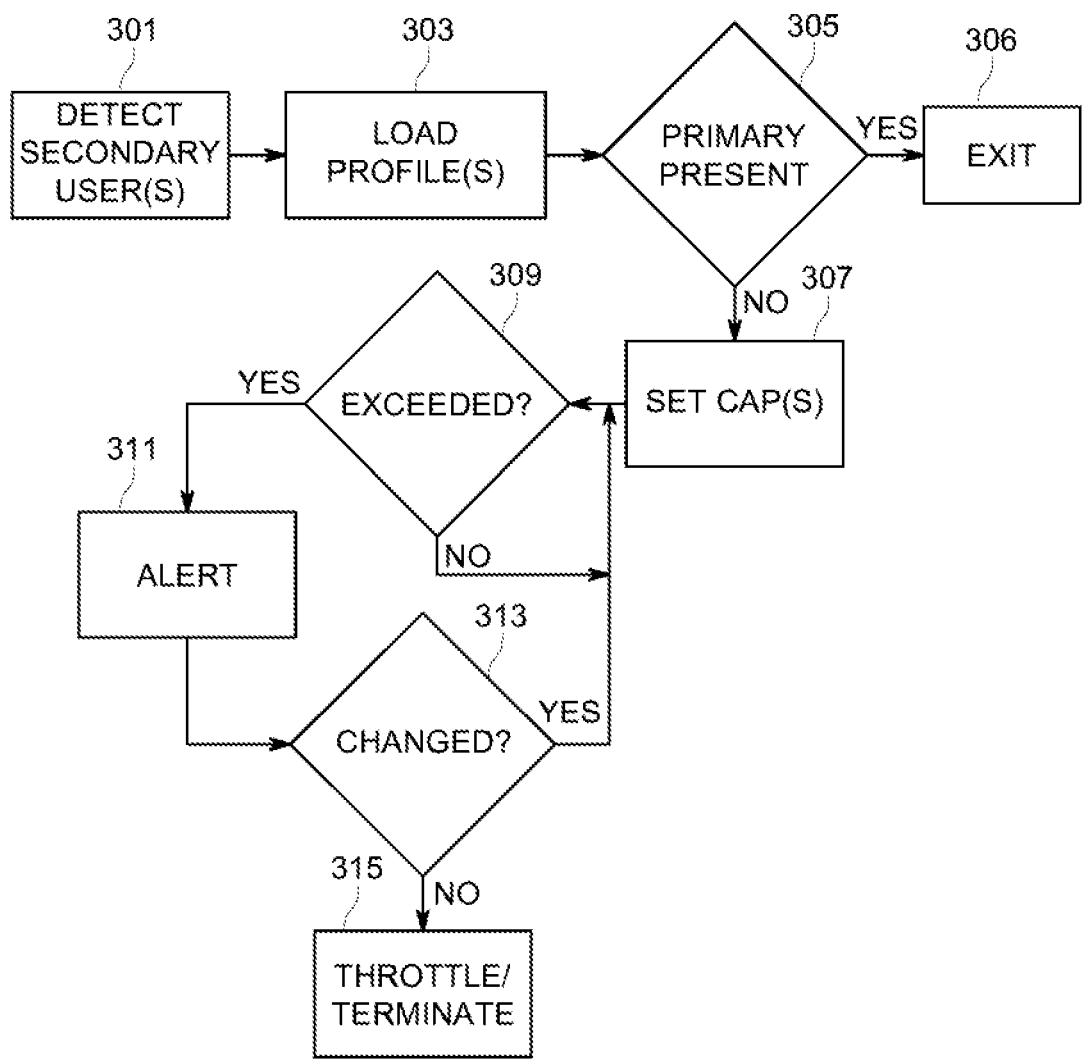
FIG. 3 shows an illustrative process for individual user network control.

FIG. 3 shows an illustrative process for individual user network control, executable by, for example, a vehicle 100 processor 101. In this example, the vehicle 100 may detect the presence of one or more secondary user devices at 301, and load control profiles associated with each user at 303. For example, an owner/driver may set one set of caps and constraints for a teenage user and another set of constraints for a rental user. Also, in this example, if the primary user is present at 305 in the vehicle 100 (e.g., the vehicle 100 detects the user device, the user is logged-in, etc.), the vehicle 100 may ignore any individual constraints set for other scenarios and exit the control process at 306, since the primary user is available to directly control device 150 usage if inappropriate.

If the primary user is not present, the vehicle 100 may set one or more caps on aggregate or over-time data usage at 307. The vehicle 100 may use the lowest or highest cap associated with any present device 150, if more than one device 150 is present, or may use a blend of the caps. Again, this may be dictated by a user-configurable manner and/or may include an OEM presetting to use as a default (e.g., use lowest cap until the owner changes the control strategy).

Once the cap is set, the vehicle 100 may determine at 309 if a cap is exceeded. Since throttling will affect all devices on the network, the vehicle 100 may, in some instances, revert to a higher cap, at or below the highest cap, if a lower cap is first exceeded. That is, if there are multiple devices 150 present, and each has a different cap defined therefor, the vehicle 100 may first set the aggregate cap at the lowest cap, and then progressively step up through the caps to the highest cap, as each threshold cap associated with a given device 150 is exceeded. In this case, the vehicle 100 may also alert the user that a lower user's device cap was exceeded, but the highest device cap in the vehicle 100 was not yet exceeded.

If the cap is exceeded and no new cap is defined, the vehicle 100 may alert the user at 311. Again, this may include multiple-device cap information (for each present device 150) and allow the controlling user to define a new cap or use a higher cap associated with an already-present device 150. If the controlling user changes the cap or usage constraints at 313, the vehicle 100 may enact those new constraints and continue monitoring at 309. Otherwise, the vehicle 100 may simply impose the cap at 315 as dictated by a user profile or as specified by a remote user. Again, the vehicle 100 may allow unfettered usage until a controlling user responds or may react to certain settings to automatically throttle or terminate usage, regardless of controlling user response.

Figure 4:
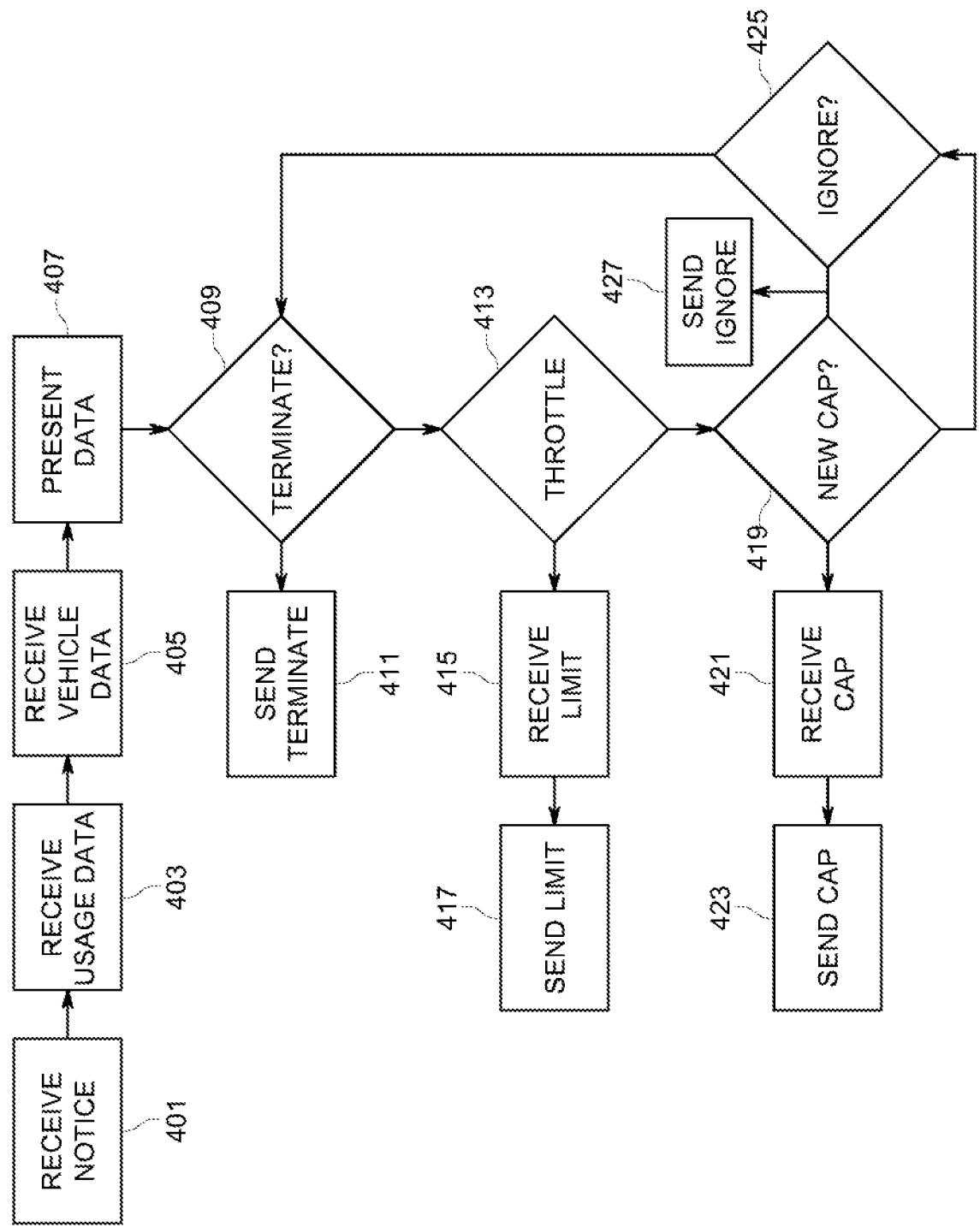
FIG. 4 shows an illustrative process for remote network control.

FIG. 4 shows an illustrative process for remote network control executable by, for example, a mobile device 140 processor 141. In this embodiment, the device 140 receives notice that a data cap has been exceeded at 401. This may include, for example, usage data at 403 (aggregate and ongoing) as well as vehicle data at 405 (which can indicate, for example, vehicle location, devices present, etc). The vehicle data received at 405 may be useful to determine if, for example, the in-vehicle user is in unfamiliar territory and may need data access for navigation or assistance purposes. The vehicle data received at 405 may also indicate whether the vehicle 100 is traveling in areas where capping data might be important to help diminish driver distraction (e.g., traffic on a highway) and in this manner the vehicle data may assist in informing a controlling-user decision about whether to cap the data.

The device 140 may present the received data to a controlling user in suitable manner at 407, such as showing representations of impactful vehicle data, locations, speeds, etc. The device 140 may also provide the controlling user with several control options, such as, for example, terminating a network at 409, throttling a network at 413 and/or setting a new overall or ongoing data cap at 419.

If the controlling user elects to terminate the network, the device 140 may send a termination signal to the cloud 130 data services 131 at 411, and the data services 131 may deliver this instruction to the vehicle 100. The vehicle 100 may then responsively terminate vehicle network services for the secondary network 117 (or block device access to the hotspot and/or primary network 115 absent an emergency).

If the controlling user elects to throttle the data usage, the user may set a limit for the data usage at 415 (e.g., slow a transfer rate) and send the limit to the cloud 130 data services 131 at 417. The cloud 130 data services 131 can relay this limit to the vehicle 100 through the TCU and the vehicle 100 can responsively throttle the data transfer capabilities as prescribed by the controlling user.

If the controlling user elects to set a new data cap, the user can define a new aggregate cap or ongoing continual usage cap at 421 (e.g., 1 GB max per trip or 10 Mb/s max, as an example of each type). The device 140 may also suggest caps associated with common usage, such as recommending an ongoing cap that should allow processing of navigation requests but not playback of streaming video. The device 140 may send the cap back to the vehicle 100 at 423, through the cloud 130 data services 131, for implementation.

In addition to restricting, access to the network unless there is an emergency, the vehicle 100 may also provide network 115 access based on a request-type. For example, if an application developer is able, through use of an application programming interface (API), to specify that a certain request type is for music, navigation, video, etc., the vehicle 100 may electively (based on configuration settings) unconstrain the network 115, 117 in response to receiving certain types of requests. This would allow for processing of certain requests at full speed, while constraining others. Since any device on the secondary network 117 may be able to act in an unconstrained manner while the constraint is lifted for a navigation request, for example, the process can also immediately re-engage constraints once the request is fulfilled.

The illustrative embodiments allow for directed user control of a secondary network, including throttling data responsive to over-use, and improving the overall granularity of vehicle hotspot control. By parameterizing user constraints and/or for allowing direct control, an owner can provide hotspot access with less fear that the system will be abused or expensively overused, since the owner can achieve better ongoing access control.

Computing devices described herein generally include computer-executable instructions where the instructions may be executable by one or more computing devices such as those listed above. Computer-executable instructions, such as those of the processes described herein, may be compiled or interpreted from computer programs created using a variety of programming languages and/or technologies, including, without limitation, and either alone or in combination, JAVA™, C, C++, C#, VISUAL BASIC, JAVASCRIPT, PYTHON, JAVASCRIPT, PERL, PL/SQL, etc. In general, a processor (e.g., a microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
    an in-vehicle hotspot including a primary and secondary network; and
    a processor configured to
      detect a wireless device predesignated as a secondary device,
      grant the secondary device access to the secondary network,
      search for device designated as a primary wireless device using short-range wireless communication, and
      responsive to a failure to find the primary wireless device, impose a usage limit, permitting but limiting access, on the secondary network, wherein the processor is configured to limit secondary network data transfer responsive to detecting that the secondary device has exceeded the usage limit.

2. The system of claim 1, wherein the usage limit includes an aggregate data transfer limit during a journey.

3. The system of claim 1, wherein the usage limit includes an aggregate data transfer limit during a predetermined time-increment.

4. The system of claim 1, wherein the usage limit includes an aggregate data limit defined based on an amount of data included remaining in a monthly plan associated with the hotspot.

5. The system of claim 1, wherein limiting the data transfer includes limiting a data transfer rate.

6. The system of claim 1, wherein limiting the data transfer includes limiting a total volume of data for the remainder of a journey.

7. The system of claim 1, wherein the processor is further configured to:
    detect the primary device, following imposition of the usage limit; and
    remove the usage limit responsive to detection of the primary device.

8. The system of claim 1, wherein the processor is further configured to:
    detect the primary device, following limiting of the data transfer; and
    remove the data transfer limiting responsive to detection of the primary device.

9. The system of claim 1, wherein the processor is configured to:
    detect a plurality of secondary wireless devices, having varied predefined usage limits associated therewith;
    grant the secondary network access to the plurality of secondary devices; and
    impose the usage limit based on a most-restrictive of the varied predefined usage limits associated with the plurality of secondary devices.

10. A system comprising:
an in-vehicle hotspot including a primary and secondary network; and
a processor configured to
- detect a wireless device predesignated as a secondary device;
- grant the secondary device access to the secondary network;
- search for a primary wireless device using short-range wireless communication;
- responsive to a failure to find the primary wireless device, imposing a usage limit on the secondary network;
- wirelessly notify the primary wireless device, using long-range wireless communication, when the usage limit is exceeded; and
- wherein the processor is configured to limit data transfer on the secondary network responsive to the usage limit being exceeded, the limit defined based on instructions received remotely from the primary wireless device responsive to the notification.

11. The system of claim 10, wherein the instructions include instructions to limit data transfer speeds.

12. The system of claim 10, wherein the instructions include instructions to terminate data transfer.

* * * * *